United States

Anderson et al.

[11] 3,777,153

[45] Dec. 4, 1973

[54] FIBER OPTICS LIGHT PEN

[75] Inventors: Brent F. Anderson; Charles W. Bytheway, both of Salt Lake City; Don L. Olson, Bountiful, all of Utah

[73] Assignee: Sperry Rand Corporation, New York, N.Y.

[22] Filed: May 17, 1972

[21] Appl. No.: 254,205

[52] U.S. Cl. .............................. 250/227, 350/96 B
[51] Int. Cl. .............................................. G02b 5/14
[58] Field of Search ................ 250/219 D, 219 CR, 250/227; 235/61.11 E; 350/96 R, 96 B

[56] References Cited
UNITED STATES PATENTS

| | | | |
|---|---|---|---|
| 3,475,612 | 10/1969 | Stupar | 250/227 |
| 3,334,236 | 8/1967 | Bacon | 250/227 |
| 3,509,354 | 4/1970 | Reilly | 250/227 |
| 3,509,353 | 4/1970 | Sundblad | 250/227 |
| 3,484,614 | 12/1969 | Tobey | 250/227 |
| 3,305,689 | 2/1967 | Leavy | 250/227 |
| 3,497,701 | 2/1970 | Dalton | 250/227 |
| 3,584,779 | 6/1971 | Kessler | 250/227 |
| 3,430,057 | 2/1969 | Genahr | 250/227 |
| 3,498,692 | 3/1970 | Jewitt | 350/96 B |
| 3,474,234 | 10/1969 | Rieger | 250/227 |

*Primary Examiner*—James W. Lawrence
*Assistant Examiner*—D. C. Nelms
*Attorney*—Kenneth T. Grace et al.

[57] ABSTRACT

A light pen for operator interface with the cathode ray tube display of a data processing system is disclosed. The light pen incorporates two fiber optics bundles; a first circle of fibers for sensing the CRT light that is emitted from the display in the target area, and a second ring of fibers, concentric about the first circle of fibers, for projecting a visible ring of light on the display which ring of light can encircle the target area. The projected ring of light provides for ease of identification of the desired data by accurately aiming the light pen at the target area. Additionally provided within the light pen is a light switch for initiating an interrupt function signal that then permits the operator to modify the data within the target area.

13 Claims, 12 Drawing Figures

FIBER OPTICS LIGHT PEN

BACKGROUND OF THE INVENTION

The present invention relates to electronic data processing systems in which an operator may project data upon a cathode ray tube display and, by means of a light pen, selectively modify selected portions of such data. A conventional light pen such as that of the J. W. Jewitt, et al., U.S. Pat. No. 3,498,692 incorporates a fiber optics bundle for conducting CRT light that is emitted from the face of the cathode ray tube to a CRT light detector for the identification of selected data within a target area. In this J. W. Jewitt, et al., patent, light from the fiber optics bundle is blocked from transmission from the light pen at all times except when the tip of the light pen is pressed against the cathode ray tube face, including the protecting implosion shield, in the target area. Because of the thickness of the implosion shield there are provided parallex effects that make it difficult for the operator to accurately align the light pen with the desired target area thereby causing erroneous effects to be produced upon the data in the target area that are detected by the light pen. Other systems such as that of the R. A. Thorpe U.S. Pat. No. 3,505,666 have utilized light pens incorporating a plurality of, i.e., four, fiber optics bundles for causing a spot or pattern of light on the face of the cathode ray tube to follow movements of the light pen. However, none of the known prior art arrangements have utilized fiber optics to project a ring of light upon the cathode ray tube face to permit accurate identification of the target area prior to initiating modification of the display in the target area.

SUMMARY OF THE INVENTION

In the present invention there is provided a novel light pen that permits the operator to accurately aim the light pen at the target area while overcoming the parallax effects of the cathode ray tube implosion shield. The light pen of the present invention incorporates two fiber optics bundles; a first circle of fibers is provided for sensing the CRT light that is emitted from the display in the target area, and a second ring of fibers, concentric about the first circle of fibers, projects a ring of visible light on the display. The second fiber optics bundle, at the opposite end external to the light pen, terminates at a visible light source while the first fiber optics bundle at the opposite end external to the light pen, terminates at a CRT light detector that does not respond to the relatively low frequency light emitted by the visible light source but does respond to the relatively high frequency light emitted by the P-31 phosphor that inside-coats the CRT face. Additionally, some first random fibers that may be taken from the second fiber optics bundle are bundled with some second random fibers to pass through an opening in the light pen's internal stem; the second random fibers, at the opposite end external to the light pen, terminate at a visible light detector.

In operation, the light pen normally emits visible light out its tip from the ring of the second fiber optics bundle; however, the CRT light detector that is coupled to the first fiber optics bundle is not responsive thereto. When the operator wishes to examine and/or modify certain display data he first centers the data within the ring-like light beam that is projected upon the CRT face from the ring of the second fiber optics bundle. Next, he presses the tip of the light pen upon the CRT implosion shield (spaced from and in front of the CRT face) and with the data centered within the ring-like circle of light he causes the visible light from the first random fibers to be reflected back into the second random fibers, i.e., closes an otherwise normally-open light switch, and thence to the visible light detector. The visible light detector then couples a signal through the associated display/data processing system that in effect states that each line trace that is painted upon the CRT face and the resulting CRT light impulse that is detected by the CRT light detector (from the area of interest within the ring-like light beam) is the desired "hit." The closing of the light switch initiates, through the visible light detector, an interrupt function signal that then permits the operator to modify the data as desired. This inclusion of the light switch in the light pen permits the operator to perform all necessary operations with the light pen alone in contrast to the prior art method in which the operator upon activating the light pen by pressing it against the implosion shield was required to concurrently press a keyboard interrupt function key on an associated keyboard control unit. Thus, the novel light pen of the present invention permits the operator to utilize only one hand while concentrating upon the display.

DESCRIPTION OF THE PREFERRED EMBODIMENT

Figure 1:
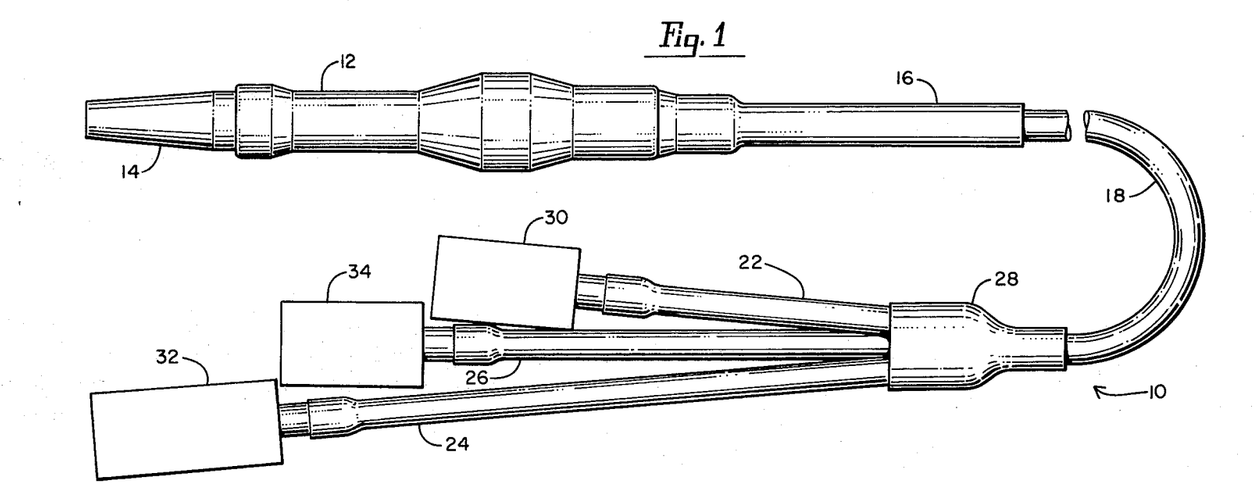
FIG. 1 is an illustration of a novel light pen of the present invention.

With particular reference to FIG. 1 there is presented an illustration of the novel light pen assembly of the present invention. Light pen assembly 10 includes a cylindrical-like barrel 12 terminating on its forward end in a frusto-conical tip 14. Extending from the rearward end of barrel 12 are a plastic tubing 16 and a plastic sheathing 18 which sheathing 18 encompasses and functions as a protective coating for first fiber optics bundle 22, second fiber optics bundle 24 and third fiber optics bundle 26 and which terminates at plastic tubing 28. Coupled to the fiber optics bundles are the following items: to the first fiber optics bundle 22 a CRT light detector 30; to the second fiber optics bundle 24 a visible light source 32; and to the third fiber optics bundle 26 a visible light detector 34.

Figure 2:
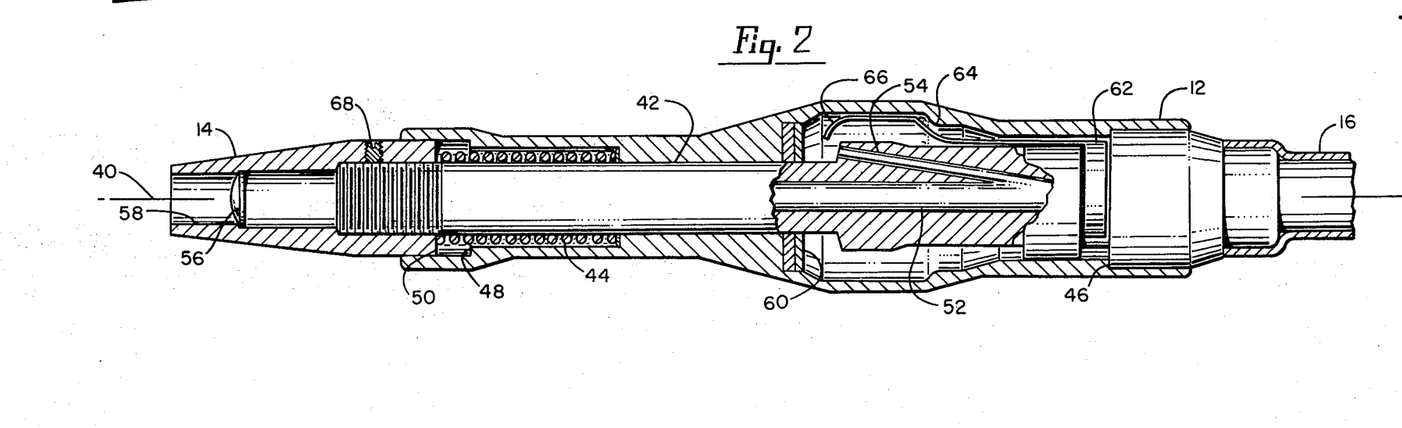
FIG. 2 is a cross-section of the light pen of FIG. 1 taken along its longitudinal axis.

With particular reference to FIG. 2 there is presented a cross-section of the light pen assembly 10 of FIG. 1 taken along its longitudinal axis 40. FIG. 2 particularly illustrates the generally cylindrical stem 42 that moves in a fore and aft direction within barrel 12 being spring biased in the forward direction by coil spring 44; the forward movement of stem 42 being limited by shoulder 46 on the rearward end of barrel 12 while the rearward movement of stem 42 is established by shoulder 48 on the forward end of barrel 12—the total longitudinal movement of stem 42 within barrel 12 being determined by the spacing between shoulder 48 of barrel 12 and the rearward surface 50 of tip 14.

Figure 10:
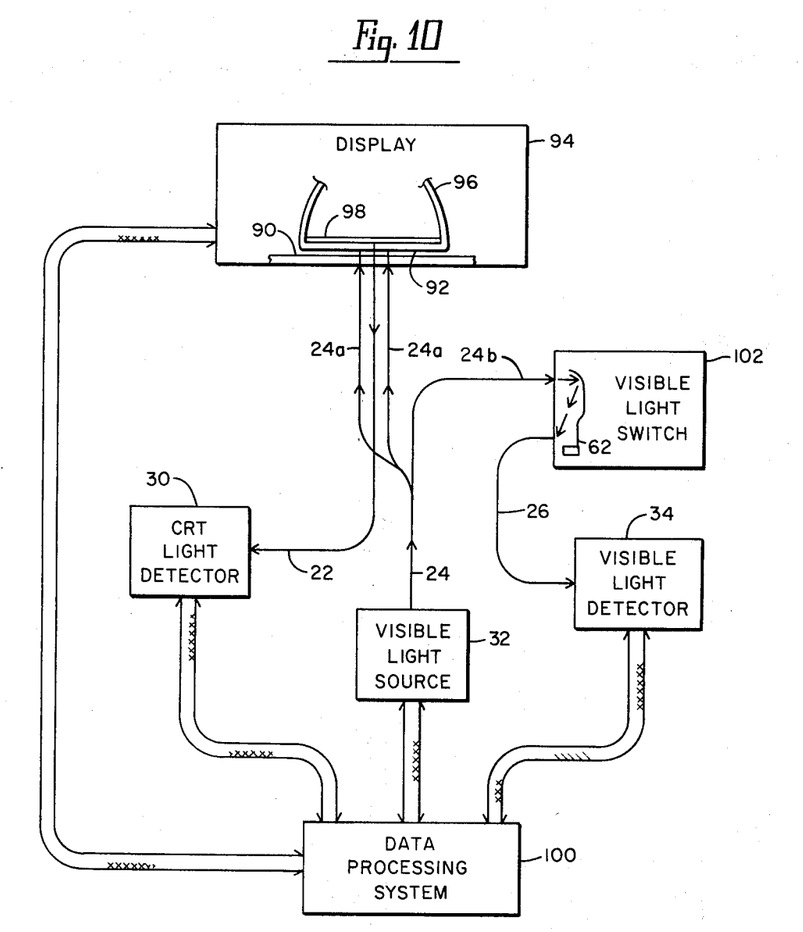
FIG. 10 is a diagrammatic illustration of the light pen system of the present invention.

In the assembly of light pen assembly 10, the three fiber optics bundles 22, 24, 26—see FIG. 10—are initially formed into a generally circular cross-section with the first fiber optics bundle 22 forming a cylindrical core, e.g., of 5/64 inch diameter, with the second and third fiber optics bundles 24 and 26 formed in a concentric ring about the first fiber optics bundle 22, e.g., of one-eighth inch outside diameter. The visible light receiving fibers of the third fiber optics bundle 26 and the visible light transmitting fibers 24b from the second fiber optics bundle 24 are randomly bundled together and are initially passed through the cylindrical bore or central opening 52 of stem 42 and then out the light switch aperture 54. The remaining first and second fiber optics of bundles 22, 24a are passed through the bore 52 and out the forward threaded end of stem 42. The first and second fiber optics bundles 22, 24a are then bonded in the forward opening 76—see FIG. 4—of bore 52 with the forward ends thereof grounded and polished. Tip 14 is capped by lense 56 which may be bonded in place.

In normal operation, the ring-like second fiber optics bundle 24a—see FIG. 10—emits a ring-like visible light beam out of the cylindrical bore or central opening 58 at the forward end of tip 14 and concentric to the longitudinal axis 40 of light pen assembly 10. When the forward end of tip 14 is pressed against the implosion shield of the display the barrel 12 moves in a forward direction against the spring bias of spring 44 until shoulders 48, 50 come into contact. Prior to this time, however, the light emitted by the visible light emitting fibers 24b of the second fiber optics bundle 24 in aperture 54 impinges upon washer-like light absorber 60 which may be bonded in place. With light absorber 60 normally absorbing the light emitted by the visible light producing fiber optics 24b of the second fiber optics bundle 24 there is no visible light reflected back into the visible light receiving fibers of the third fiber optics bundle 26 in aperture 54. However, when barrel 12 is pushed forward toward the display the spring 62, through the camming action of shoulder 64 of barrel 12, is at its tip 66 forced in a downwardly direction intercepting the transmitted visible light beam from fibers 24b whereby the visible light beam is reflected back into the receiving fiber optics of the third fiber optics bundle 26.

The cylindrical light stem 42 is, at its forward end, threaded into tip 14 in a secure manner as by screw 68 whereupon the barrel 12 is able to rotate in a free manner about its internal hardware placing no rotational stresses thereon.

Figure 3:
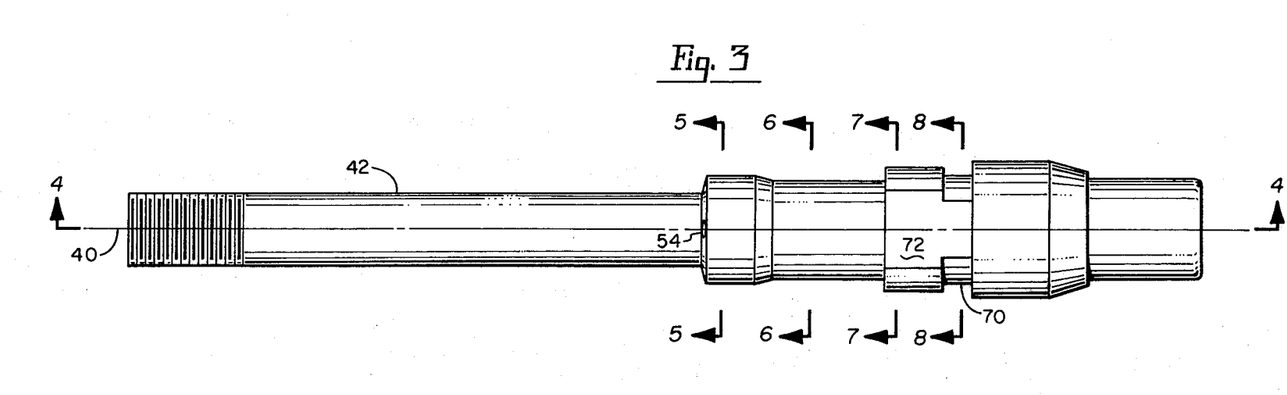
FIG. 3 is a side view of the stem of the light pen of FIG. 2.

With particular reference to FIG. 3 there is presented a side view of the stem 42 of FIG. 2. Stem 42 is of a generally circular cross-section except in the area where spring 62 is compressively attached thereto as by circular groove 70 and flat surface 72.

Figure 4:
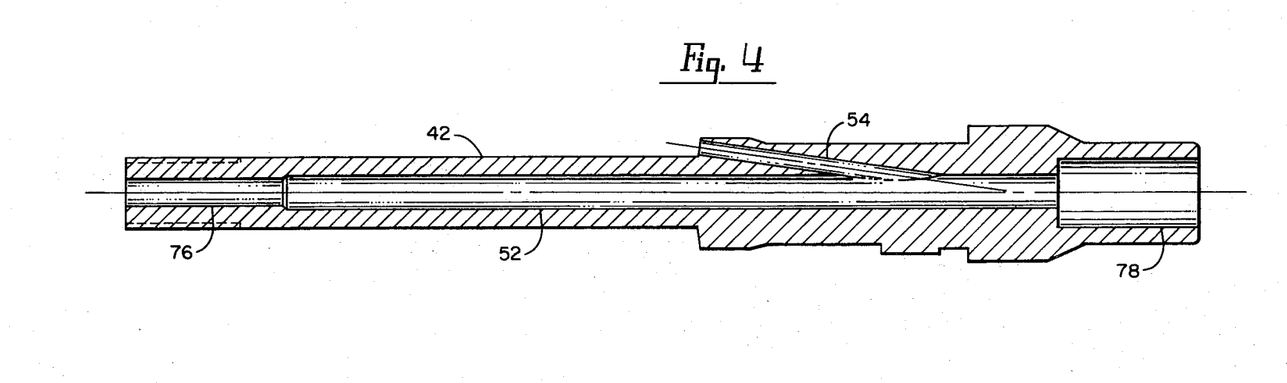
FIG. 4 is a cross-section of the stem of FIG. 2 taken along its longitudinal axis.
Figure 5:
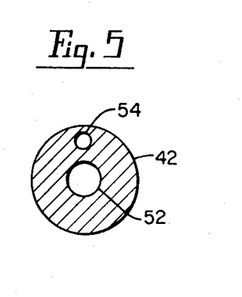
FIG. 5 is a cross-section of the stem of FIG. 3 taken along line 5—5.
Figure 6:
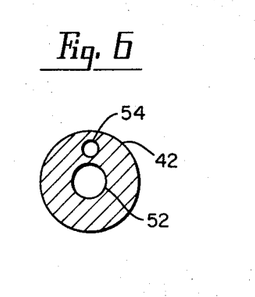
FIG. 6 is a cross-section of the stem of FIG. 3 taken along line 6—6.
Figure 7:
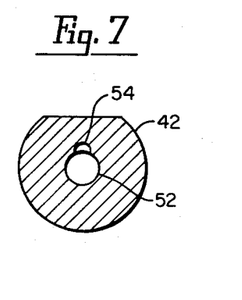
FIG. 7 is a cross-section of a stem of FIG. 3 taken along line 7—7.
Figure 8:
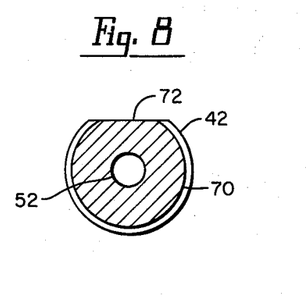
FIG. 8 is a cross-section of the stem of FIG. 3 taken along line 8—8.

With particular reference to FIG. 4 there is presented a cross-section of the stem 42 of FIG. 3 taken along line 4—4 of the longitudinal axis 40 of FIG. 3. Stem 42 is illustrated as having a cylindrical bore or central opening 52 of, e.g., 5/32 inch diameter; having a forward bore 76 of, e.g., one-eighth inch diameter for snuggly receiving the first fiber optics bundle 22 and the encircling second fiber optics bundle 24a, and a central bore 78 at its aft end for receiving first fiber optics bundle 22, second fiber optics bundle 24, third fiber optics bundle 26 and its protective sheathing 18. Light switch aperture 54 is illustrated as being an, e.g., 0.0980 inch diameter, hole inclined at an angle, e.g., of 7½°, to the longitudinal axis 40 for receiving the 3/32 inch OD fiber optics bundle formed; of one-half visible light transmitting fibers 24b from the second fiber optics bundle 24, and of one-half visible light receiving fibers 26 forming the third fiber optics bundle 26.

With particular reference to FIGS. 5, 6, 7 and 8 there are illustrated the respective cross-sections of stem 42 taken normal to the longitudinal axis 40 along the respectively numbered lines of FIG. 3. These cross-sectional views are presented to particularly illustrate the orientation of the light switch aperture 54 with respect to the central bore 52 and the outside conformations of stem 42.

Figure 9A:
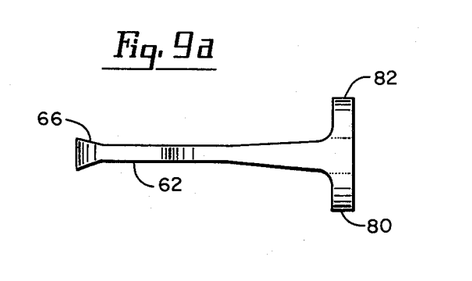
FIGS. 9a, 9b, 9c are views of a light pen switch spring of FIG. 2.
Figure 9B:
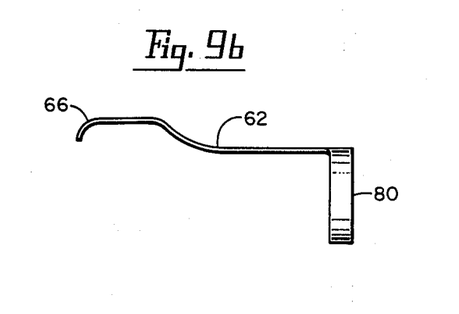
Figure 9C:
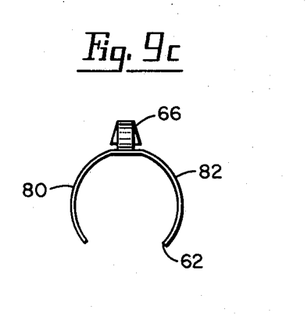

With particular reference to FIGS. 9a, 9b and 9c there are presented the three orthographic projections of the light switch spring 62 of FIG. 2. Spring 62 is preferrably formed of a 0.003 inch thick beryllium-copper ASTMB 194. Spring 62 is formed to have two partially circular wings 80, 82 specifically designed to fit in a compressing manner within groove 70 of stem 42 and to have a curved lip 66 that is preferably painted of a white material, both sides, to facilitate the reflective properties thereof.

With particular reference to FIG. 10 there is presented a diagrammatic illustration of the light pen system of the present invention. In the operation of the light pen assembly 10 of the present invention visible light source 32 normally couples visible light to the second fiber optics bundle 24a which projects a ring-like circle of light through transparent implosion shield 90 and upon the CRT face 92, all schematically illustrated in display 94. With the tip 14 of light pen assembly 10 pressed against implosion shield 90 causing barrel 12 to move to its forward stop position against the rearward end 50 of tip 14 the first fiber optics bundle 22 detects the relatively high frequency CRT light emitted by the P-31 phosphor 98 that coats the inside surface of CRT 96. The first fiber optics bundle 22 detects, upon each painting of the trace upon the CRT face 92, within the ring-like circle of light on CRT face 92, a light impulse that is coupled to CRT light detector 30. A data processing system 10 electronically determines the precise position on the CRT face 92 that is within the area of interest as defined by the ring-like circle of light thereon. Concurrently, the visible light switch 102 formed by spring 62 reflects the light transmitted by fiber optics bundle 24b back onto the third fiber optics bundle 26 and thence to visible light detector 34. Visible light detector 34, in turn, couples the appropriate signal to data processing system 100 whereby there is generated an interrupt function signal that then permits the operator to modify the data within the area of interest.

Thus, it is apparent that applicants' novel light pen assembly including (a) a fiber optics bundle for transmitting a ring-like circle of light upon the CRT face for accurately aiming the light pen at the area of interest and (b) a visible light switch for signalling that an interrupt function signal is required, provides a light pen that permits the operator to perform all the necessary operations with one hand keeping his other hand free for other necessary operations without requiring the utilization of a keyboard interrupt function key on an associated keyboard control unit.

Following is a partial list of the component parts of the novel light pen assembly 10, no limitation thereto intended:

Parts: Stem 42 and Tip 14
  Material: Polycarbonate
  Supplier: General Electric Company Chemical Materials Department 1 Plastics Avenue Pittsfield, Massachusetts 01201
  Supplier's Designation: Lexan (Polycarbonate)

Parts: Visible Light Source 32 and Fiber Optics (of bundles 22, 24, 26)
  Supplier Welch Alynn 99 Jordan Road Skaneateles Falls, New York 13153
  Supplier's Designations: Lamp No. 999079-6
  Glass Fibers - K1 glass 0.0020 ± 0.0002 dia.

Part: Light Absorber 60
  Supplier: Scott Paper Company Chester, Pennsylvania 19013
  Supplier's Material Designation: Scottfore 3mm and 1mm blue Part: CRT Light Detector 30
  Supplier: Monsanto Company Electronic Products and Controls Division, 10131 Bubb Road Cupertino, California 95014
  Supplier's Designation: Photo diode No. MD2

Part: Visible Light Detector 34
  Supplier: Clairex Electronics Inc. Dept. T 560 S. Third Avenue Mount Vernon, New York 10551
  Supplier's Designation: Photo Conductor Cell No. CL905HL Part: LENS (Double Convex) 56
  Supplier: Sterling Glass Inc. 2315 W. 136th Street Blue Island, Illinois 60406
  Supplier's Designation: Lens, Double Convex No. 817

What is claimed is:

1. A light pen, comprising:
a generally cylindrical barrel having a central opening along its longitudinal axis;
a generally cylindrical stem assembled within the central opening of said barrel and having a central opening along its longitudinal axis, a forward threaded end, and a light switch aperture passing from its central opening to its outside surface;
a light switch spring compressively secured about the outside surface of said stem and within the central opening of said barrel and having a tip that is normally spring biased out of alignment with said light switch aperture;
a coil spring assembled about the outside surface of said forward end of said stem and within the central opening of said barrel;
a generally frusto-conical tip having a central opening along its longitudinal axis and threadedly attached to the forward end of said stem for spring biasing said stem in a forward direction along its longitudinal axis with respect to said barrel;
a fiber optics cable assembly passing into the rearward end of the central opening of said stem and;
including the central opening of said tip at the forward end of said stem;
  a first fiber optics bundle arranged in a generally circular cross-section;
  a second fiber optics bundle arranged in a generally ring-like cross-section concentric about said first fiber optics bundle;
including in said light switch aperture a random bundle of optical fibers arranged in a generally circular cross-section comprising:
  a third fiber optics bundle;
  a fourth fiber optics bundle;
a CRT light detector coupled to the rearward end of said first fiber optics bundle;
a visible light source coupled to the rearward end of said second and fourth fiber optics bundles; and,
a visible light detector coupled to the rearward end of said third fiber optics bundle.

2. A light pen, comprising:
a barrel having a central opening along its longitudinal axis;
a stem, assembled within the central opening of said barrel, having a tip at its forward end, a central opening along its longitudinal axis and a light switch aperture passing from its central opening to its outside surface;
a fiber optics cable assembly passing into the rearward end of the central opening of said stem and; terminating in the forward end of said tip in
  a first fiber optics bundle having a generally circular cross-section;
  a second fiber optics bundle having a generally ring-like cross-section and assembled concentric about said first fiber optics bundle;
terminating in said light switch aperture in a random bundle of optical fibers comprising;
  a third fiber optics bundle;
  a fourth fiber optics bundle;
said random bundle of optical fibers passing through said light switch aperture and terminating outside said stem.

3. The light pen of claim 2 further including a biasing spring assembled within the central opening of said barrel for spring biasing said stem and said tip in a forward direction along their longitudinal axis with respect to said barrel.

4. The light pen of claim 2 further including a light switch spring, assembled within the central opening of said barrel, having a lip that is biased out of alignment with said random bundle of optical fibers when said stem tip is biased by said biasing spring away from the forward end of said barrel but is biased in alignment with said random bundle of optical fibers when said stem tip is moved against said biasing spring bias toward the forward end of said barrel.

5. The light pen of claim 4 further including:
a CRT light detector coupled to the rearward end of said first fiber optics bundle;
a visible light source coupled to the rearward end of said second and fourth fiber optics bundles; and,
a visible light detector coupled to the rearward end of said third fiber optics bundle.

6. The light pen of claim 5 in which said light switch spring lip when biased in alignment with said random bundle of optical fibers reflects the light transmitted from said fourth fiber optics bundle back toward said third fiber optics bundle for activating said visible light detector.

7. The light pen of claim 2 wherein the central opening of said barrel is of a circular cross-section for rotating said barrel freely about said stem.

8. A light pen, comprising:
- a barrel having a central opening along its longitudinal axis;
- a stem assembled within the central opening of said barrel, having a central opening along its longitudinal axis and a light switch aperture passing from its central opening to its outside surface;
- a tip at the forward end of said stem having a central opening along its longitudinal axis for receiving a fiber optics cable assembly;
- a fiber optics cable assembly passing into the rearward end of the central opening of said stem and; terminating in said central opening of said tip in
- a first fiber optics bundle arranged in a generally circular cross-section;
- a second fiber optics bundle arranged in a generally ring-like cross-section concentric about said first fiber optics bundle;
- terminating in said light switch aperture in a random bundle of optical fibers arranged in a generally circular cross-section and comprising;
- a third fiber optics bundle;
- a fourth fiber optics bundle;
- said random bundle of optical fibers passing through said light switch aperture and terminating at the outside surface of said stem.

9. The light pen of claim 8 further including a coil spring assembled about the outside surface of said stem and within the central opening of said barrel for spring biasing said stem and said tip in a forward direction along their longitudinal axis with respect to said barrel.

10. The light pen of claim 8 further including a light switch spring compressively secured about the outside surface of said stem and within the central opening of said barrel and having a lip that is biased out of alignment with said random bundle of optical fibers when said stem and said tip are biased by said coil spring away from the forward end of said barrel but is biased in alignment with said random bundle of optical fibers when said stem and said tip are moved against said coil spring bias toward the forward end of said barrel.

11. The light pen of claim 10 further including:
- a CRT light detector coupled to the rearward end of said first fiber optics bundle;
- a visible light source coupled to the rearward end of said second and fourth fiber optics bundles; and,
- a visible light detector coupled to the rearward end of said third fiber optics bundle.

12. The light pen of claim 11 in which said light switch spring lip when biased in alignment with said random bundle of optical fibers reflects the light transmitted from said fourth fiber optics bundle back toward said third fiber optics bundle for activating said visible light detector.

13. The light pen of claim 8 wherein the central opening of said barrel is of a circular cross-section for rotating said barrel freely about said stem.

* * * * *

UNITED STATES PATENT OFFICE
CERTIFICATE OF CORRECTION

Patent No. 3,777,153                Dated December 4, 1973

Inventor(s) Brent F. Anderson et al.

It is certified that error appears in the above-identified patent and that said Letters Patent are hereby corrected as shown below:

Claim 1, column 6, line 6, "including the" should be -- including in the --.

Claim 2, column 6, line 34, after "tip in" insert a semicolon -- ; --.

Claim 2, column 6, lines 35-39, the following two paragraphs should be indented as sub-subparagraphs of the preceding subparagraph:

"a first fiber optics bundle ... cross-section;"

"a second fiber optics bundle ... optics bundle;"

Claim 2, column 6, lines 42-46, the following three paragraphs should be indented as sub-subparagraphs of the preceding subparagraph:

"a third fiber optics bundle;"

"a fourth fiber optics bundle;"

"said random bundle of ...outside said stem."

Claim 8, column 7, lines 23-27, the following two paragraphs should be indented as sub-subparagraphs of the preceding subparagraph:

"a first fiber optics ... cross-section;"

"a second fiber optics ... optics bundle;"

UNITED STATES PATENT OFFICE
CERTIFICATE OF CORRECTION

Patent No. 3,777,153　　　　　　　　　Dated December 4, 1973

Inventor(s) Brent F. Anderson et al.

It is certified that error appears in the above-identified patent and that said Letters Patent are hereby corrected as shown below:

Claim 8, column 7, lines 31-34, the following three paragraphs should be indented as sub-subparagraphs of the preceding subparagraph:

"a third fiber optics bundle;"

"a fourth fiber optics bundle;"

"said random bundle of ... of said stem."

Signed and sealed this 25th day of June 1974.

(SEAL)
Attest:

EDWARD M. FLETCHER, JR.　　　　　　C. MARSHALL DANN
Attesting Officer　　　　　　　　　　Commissioner of Patents